US009935573B2

United States Patent
Vovos et al.

(10) Patent No.: US 9,935,573 B2
(45) Date of Patent: Apr. 3, 2018

(54) FOUR QUADRANT VOLTAGE LIMITER FOR ROTOR FLUX ORIENTED MACHINE CONTROL

(71) Applicant: BAE SYSTEMS CONTROLS INC., Endicott, NY (US)

(72) Inventors: Robert J. Vovos, Vestal, NY (US); Arthur P. Lyons, Maine, NY (US)

(73) Assignee: BAE Systems Controls Inc., Endicott, NY (US)

( * ) Notice: Subject to any disclaimer, the term of this patent is extended or adjusted under 35 U.S.C. 154(b) by 0 days.

(21) Appl. No.: 14/888,263

(22) PCT Filed: Feb. 26, 2015

(86) PCT No.: PCT/US2015/017700
§ 371 (c)(1),
(2) Date: Oct. 30, 2015

(87) PCT Pub. No.: WO2015/130908
PCT Pub. Date: Sep. 3, 2015

(65) Prior Publication Data
US 2016/0079901 A1    Mar. 17, 2016

Related U.S. Application Data

(60) Provisional application No. 61/946,558, filed on Feb. 28, 2014.

(51) Int. Cl.
*H02P 21/00* (2016.01)
*H02P 21/14* (2016.01)
(Continued)

(52) U.S. Cl.
CPC .............. *H02P 21/141* (2013.01); *B60L 7/14* (2013.01); *H02P 3/14* (2013.01); *H02P 3/18* (2013.01);
(Continued)

(58) Field of Classification Search
CPC .... H02P 21/0035; H02P 21/06; H02P 21/146; H02P 2207/05; Y02T 10/643
(Continued)

(56) References Cited

U.S. PATENT DOCUMENTS

| 4,677,360 A * | 6/1987 | Garces .................... H02P 21/09 |
| | | 318/803 |
| 7,042,189 B2 | 5/2006 | Hossain et al. |
| 2005/0269983 A1 * | 12/2005 | Takai .................... B60L 11/123 |
| | | 318/432 |
| 2006/0061310 A1 * | 3/2006 | Takai ................. B60L 15/2045 |
| | | 318/139 |

(Continued)

FOREIGN PATENT DOCUMENTS

| JP | 2011-125134 | 6/2011 |
| JP | 2013-158178 | 8/2013 |
| KR | 20130138999 | 12/2013 |

OTHER PUBLICATIONS

PCT/US2015/017700 International Search Report dated May 29, 2015.

*Primary Examiner* — Kawing Chan
*Assistant Examiner* — Bradley Brown
(74) *Attorney, Agent, or Firm* — Scully Scott Murphy & Presser PC

(57) ABSTRACT

Methods, systems and computer readable storage devices for a four quadrant voltage limiter that limits a commanded phase voltage to within a volt second capability of an inverter by maintaining a rotor flux and folding back a torque under both motoring and regeneration torque commands. In one embodiment: (a) in a motoring operation, an upper limit for a q-axis voltage is enforced; and (b) in a regeneration operation a lower limit for the q-axis voltage is enforced.

17 Claims, 11 Drawing Sheets

(51) Int. Cl.
*H02P 27/06* (2006.01)
*B60L 7/14* (2006.01)
*H02P 3/14* (2006.01)
*H02P 3/18* (2006.01)
*H02P 23/06* (2016.01)
*B60K 1/02* (2006.01)

(52) U.S. Cl.
CPC .............. *H02P 23/06* (2013.01); *H02P 27/06* (2013.01); *B60K 1/02* (2013.01); *H02P 21/0089* (2013.01); *H02P 2207/03* (2013.01)

(58) Field of Classification Search
USPC .................................................... 318/400.02
See application file for complete search history.

(56) References Cited

U.S. PATENT DOCUMENTS

| | | | |
|---|---|---|---|
| 2006/0192430 A1* | 8/2006 | Takano | B60L 11/1851 307/9.1 |
| 2009/0157245 A1* | 6/2009 | Moon | B60K 6/485 701/22 |
| 2010/0090629 A1* | 4/2010 | Tang | B60L 15/025 318/400.09 |
| 2011/0025238 A1 | 2/2011 | Ueda et al. | |
| 2014/0152207 A1* | 6/2014 | Sasaki | H02P 21/0035 318/400.02 |
| 2014/0225537 A1* | 8/2014 | Omata | H02P 21/0035 318/400.02 |

* cited by examiner

FOUR QUADRANT VOLTAGE LIMITER FOR ROTOR FLUX ORIENTED MACHINE CONTROL

CROSS-REFERENCE TO RELATED APPLICATIONS

This application claims the benefit under 35 U.S.C. § 119(e) of U.S. Provisional Application Ser. No. 61/946,558, filed Feb. 28, 2014. The entire contents and disclosure of the aforementioned provisional application is incorporated by reference as if fully set forth herein.

BACKGROUND

Machine torque and flux control should be maintained even when the machine is constrained by the inverter's voltage limit. When the commanded volt seconds to the machine exceed the volt seconds available from the inverter, excessive phase current will flow as machine control will be lost. Typical operating conditions which can lead to such situations include high machine speed and/or low inverter dc link voltage.

SUMMARY

In one aspect of the disclosure, in order to provide a robust mechanism, machine control must be maintained when commanding both motoring and regeneration torque under all operating conditions.

In one aspect of the disclosure, a four quadrant voltage limiter is provided that properly limits the phase voltage commanded to within the volt second capability of the inverter by maintaining rotor flux and folding back torque under both motoring and regeneration torque commands.

In one embodiment, a processor-implemented four quadrant voltage limiter method that limits a commanded phase voltage to within a volt second capability of an inverter is provided, the four quadrant voltage limiter method comprising: in a motoring operation, enforcing by the processor an upper limit for a q-axis voltage; and in a regeneration operation, enforcing by the processor a lower limit for the q-axis voltage.

In another embodiment, a four quadrant voltage limiter system that limits a commanded phase voltage to within a volt second capability of an inverter is provided, the four quadrant voltage limiter system comprising a processor; a memory storing computer readable instructions that, when executed by the processor, implement: a first enforcing unit for enforcing, in a motoring operation, an upper limit for a q-axis voltage; and a second enforcing unit for enforcing, in a regeneration operation, a lower limit for the q-axis voltage.

In another embodiment a computer readable storage device including a computer program for four quadrant voltage limiting that limits a commanded phase voltage to within a volt second capability of an inverter is provided, the computer program including instructions for: in a motoring operation, enforcing an upper limit for a q-axis voltage; and in a regeneration operation, enforcing a lower limit for the q-axis voltage.

BRIEF DESCRIPTION OF THE DRAWINGS

Various objects, features and advantages of the present disclosure will become apparent to one skilled in the art, in view of the following detailed description taken in combination with the attached drawings, in which.

DETAILED DESCRIPTION

For the purpose of describing and claiming the present invention, the term "motoring" is intended to refer to the condition in which a motor is receiving electrical power as an input and is providing torque as an output.

For the purpose of describing and claiming the present invention, the term "regeneration" (or "generate" or "generating") is intended to refer to the condition in which a motor is receiving torque as an input and is providing electrical power as an output.

For the purpose of describing and claiming the present invention, the term "folding back torque" is intended to refer to reducing torque to a value obtainable given the physical constraints of the system (e.g., the inverter dc voltage).

For the purpose of describing and claiming the present invention, the term "voltage limited" (such as used in the context of voltage being limited in motoring or voltage being limited in regeneration) is intended to refer to a situation in which the inverter is unable to produce a requested torque and flux because the magnitude of the required AC voltage exceeds what is physically possible given the inverter's DC voltage.

For the purpose of describing and claiming the present invention, the following notation will be used:
$f_{dq}$ Complex vector quantity
$f_d$ D axis quantity
$f_q$ Q axis quantity f* Commanded quantity
$\lambda_r$ Rotor flux linkage
$i_s$ Stator current
$L_m$ Mutual inductance
$L_r$ Rotor inductance
$L_s$ Stator inductance
$L_1 = L_{ls}$ Stator leakage inductance
$L_2 = L_{lr}$ Rotor leakage inductance
$\omega_e$ Electrical speed
$r_s$ Stator resistance $$\rho = \frac{d}{dt}$$

Derivative operator
$\sigma$ Coupling coefficient
$T_e$ Electromechanical torque
$v_{dc}$ DC link voltage
$v_s$ Stator voltage quantity Reference will now be made to a conventional voltage limiter that provides an upper bound on absolute vq. In such a conventional voltage limiter, D axis priority is correctly given in order to maintain flux allowing 0 id error. When motoring in voltage limit, additional iq is limited by vq bound. When generating in voltage limit, iq runs away as the vq bound limits the additional vq voltage needed to reduce the absolute iq current.

In connection with such a conventional voltage limiter, the following equations apply:

Equations 1 and 2 [Rotor Flux Oriented Stator Voltages]:

$$v_{qs}^e = i_{qs}^e r_s + i_{ds}^e L_s \sigma \omega_e + \frac{L_m}{L_r} \lambda_{dr}^e \omega_e \qquad \text{Equation 1}$$

$$v_{ds}^e = i_{ds}^e r_s - i_{qs}^e L_s \sigma \omega_e \qquad \text{Equation 2}$$

Equations 3-6 [Conventional Voltage Limits]:

$$v_{ds\_UL}^e = \frac{v_{dc}}{\sqrt{3}} \qquad \text{Equation 3}$$

$$v_{qs\_UL}^e = \sqrt{\frac{v_{dc}^2}{3} - v_{ds}^{e*2}} \qquad \text{Equation 4}$$

$$v_{ds\_LL}^e = -\frac{v_{dc}}{\sqrt{3}} \qquad \text{Equation 5}$$

$$v_{qs\_LL}^e = -\sqrt{\frac{v_{dc}^2}{3} - v_{ds}^{e*2}} \qquad \text{Equation 6}$$

Figure 1A:
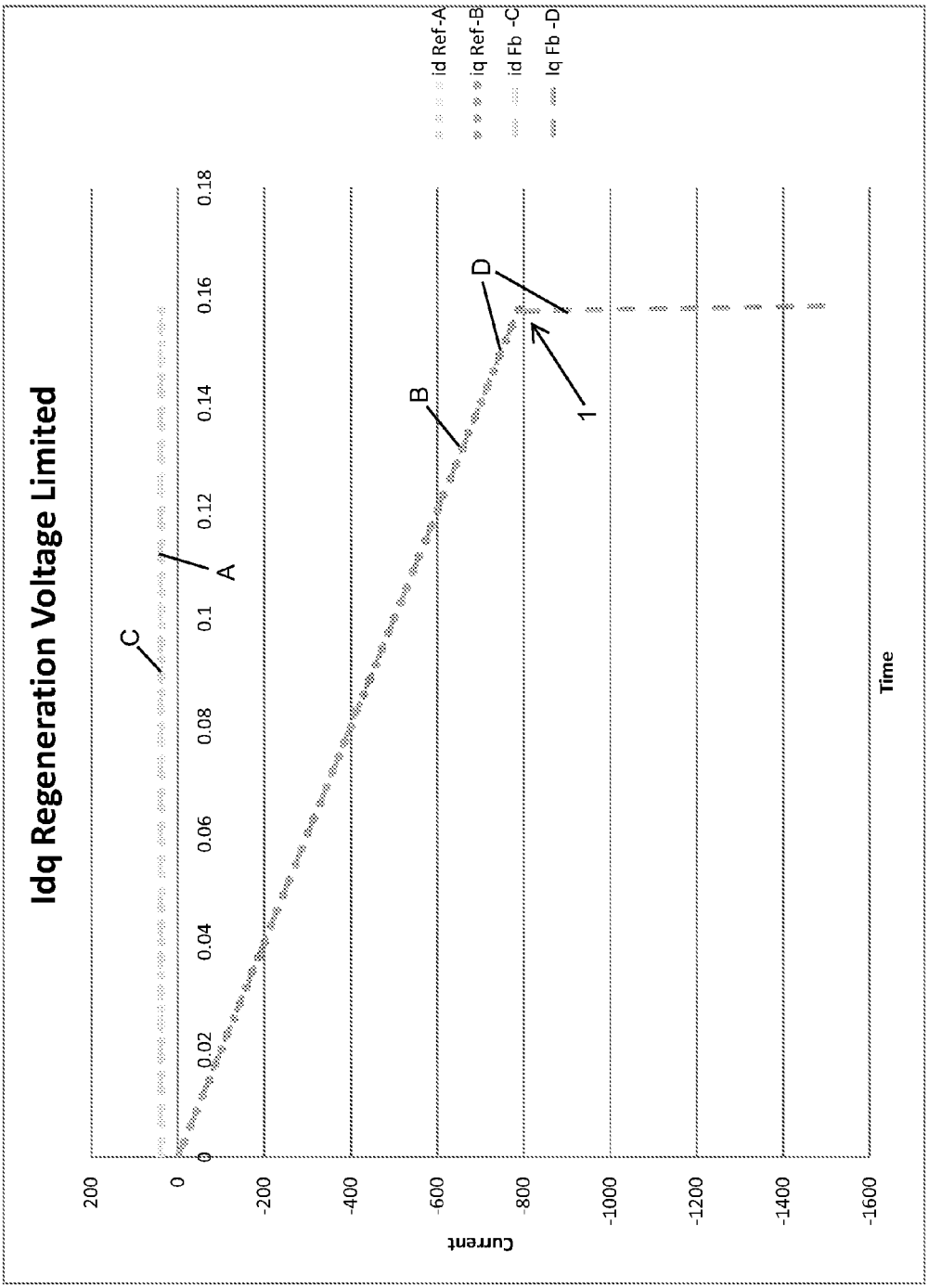
FIG. 1A illustrates a graph associated with a conventional mechanism which results in overcurrents when voltage is limited in regeneration (in particular, a graph related to Idq in regeneration when voltage is limited)

Referring now to FIG. 1A, illustrated is a graph associated with a conventional mechanism which results in overcurrents when voltage is limited in regeneration (in particular, a graph related to Idq in regeneration when voltage is limited). In connection with this FIG. 1A, id Ref (Reference) is shown as trace "A", iq Ref (Reference) is shown as trace "B", id Fb (Feedback) is shown as trace "C" and iq Fb (feedback) is shown as trace "D". In this FIG. 1A, id Ref and iq Ref refer to amounts that you want and id Fb and iq Fb refer to amounts that you are getting. As shown by arrow 1, there is immediate overcurrent because voltage cannot increase in order to pull current back.

Figure 1B:
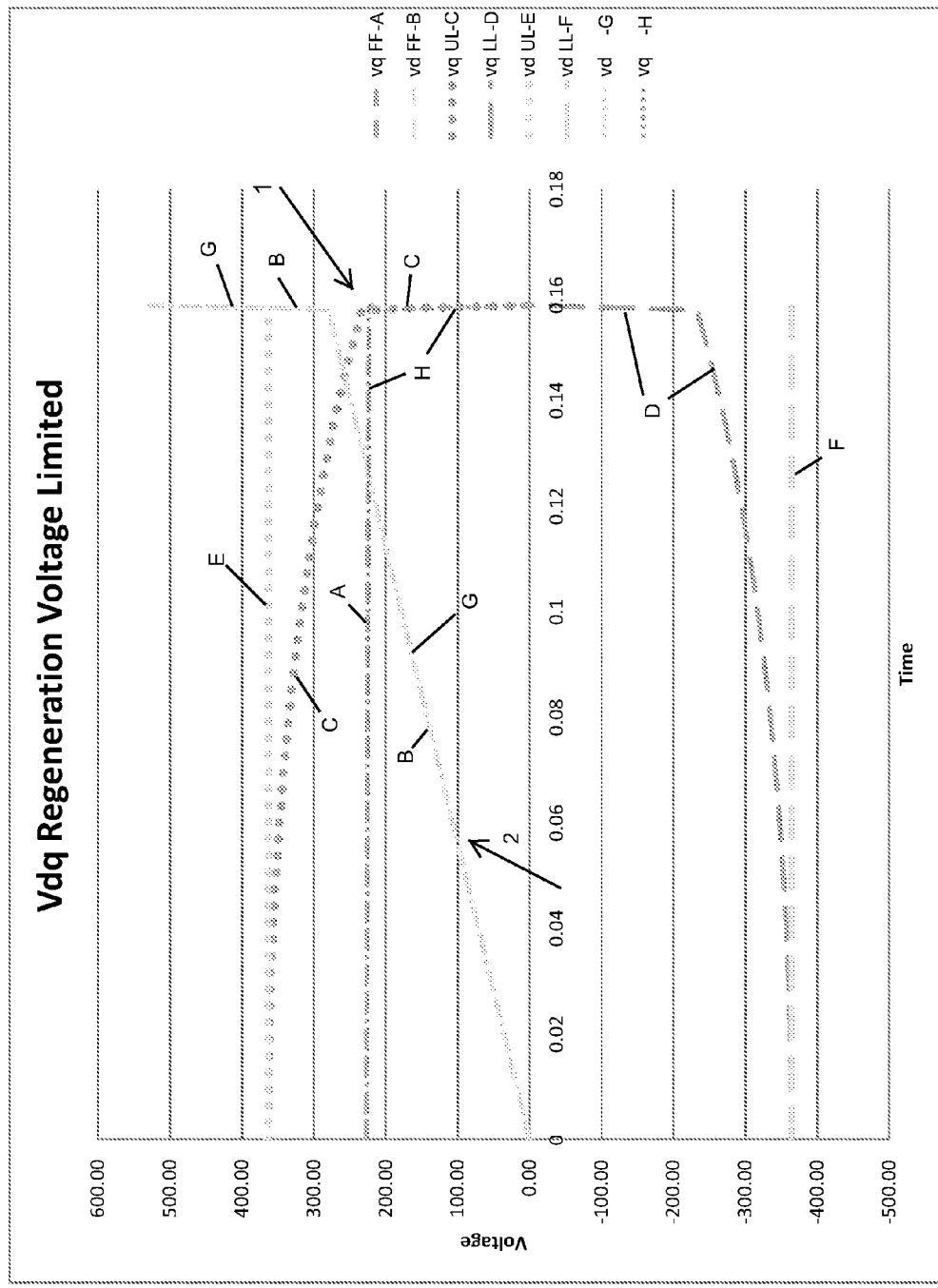
FIG. 1B illustrates a graph associated with a conventional mechanism when voltage is limited in regeneration (in particular, a graph related to Vdq in regeneration when voltage is limited)

Referring now to FIG. 1B, illustrated is a graph associated with a conventional mechanism when voltage is limited in regeneration (in particular, a graph related to Vdq in regeneration when voltage is limited). In connection with this FIG. 1B, vq FF (Feed forward) is shown as trace "A", vd FF (Feed forward) is shown as trace "B", vq UL (Upper Limit) is shown as trace "C", vq LL (Lower Limit) is shown as trace "D", vd UL (Upper Limit) is shown as trace "E", vd LL (Lower Limit) is shown as trace "F", vd is shown as trace "G" and vq is shown as trace "F" (Feed Forward are the predicted d/q voltages that are used as a "feed forward" for the current regulators). As shown by arrow 1, VqUL reduces until it limits Vq. As shown by arrow 2, Vd increases as regeneration power increases.

Figure 2:
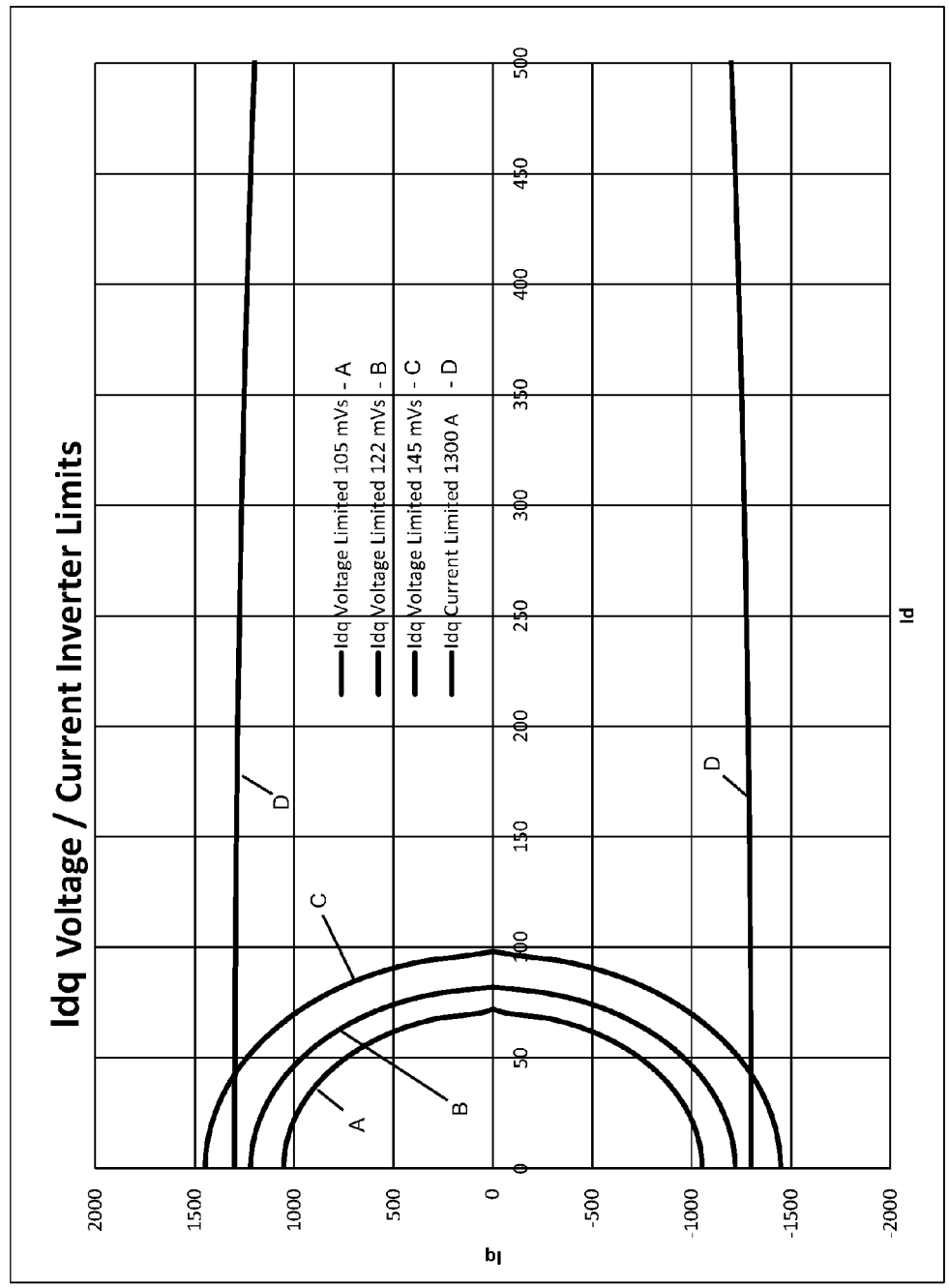
FIG. 2 illustrates a series of volt-second ellipsis (according to an aspect of the present disclosure) given a fixed machine speed and inverter dc voltage (it can be seen that for all possible current vectors a reduced absolute value of Iq results in less required dc voltage for a given operating speed)

Referring now to FIG. 2, illustrated is a series of volt-second ellipsis (according to an aspect of the present disclosure) given a fixed machine speed and inverter dc voltage (it can be seen that for all possible current vectors a reduced absolute value of Iq results in less required dc voltage for a given operating speed)

Still referring to FIG. 2, the following equations apply:

Equations 7 and 8 [Terminal Voltage]:

$$v_{qs}^e = i_{qs}^e r_s + i_{ds}^e L_s \omega_e \qquad \text{Equation 7}$$

$$v_{ds}^e = i_{ds}^e r_s - i_{qs}^e L_s \sigma \omega_e \qquad \text{Equation 8}$$

Equation 9 [Inverter Voltage Limit]:

$$v_{ds}^{e2} + v_{qs}^{e2} \leq \frac{v_{dc}^2}{\sqrt{3}} \qquad \text{Equation 9}$$

Equation 10 [High Speed]:

$$r_s \ll L_s \sigma \omega_e < L_s \omega_e \qquad \text{Equation 10}$$

Equation 11 [Inverter Voltage Limit in Current Terms]:

$$(L_s \omega_e i_{ds}^e)^2 + (L_s \sigma \omega_e i_{qs}^e)^2 \leq \frac{v_{dc}^2}{\sqrt{3}} \qquad \text{Equation 11}$$

Equation 12:

$$i_{ds}^e L_s = i_{ds}^e L_s \sigma + \frac{L_m}{L_r} \lambda_r \qquad \text{Equation 12}$$

Still referring to FIG. 2, it is seen that in this example Idq voltage limited to 105 mVs is shown as trace "A", Idq voltage limited to 122 mVs is shown as trace "B", Idq voltage limited to 145 mVs is shown as trace "C", and Idq current limited to 1300 A is shown as trace "D".

Reference will now be made to a voltage limiter according to an aspect of the present disclosure with respect to reducing Iq in generate (in particular, that in order to reduce absolute Iq in generate it is necessary to increase absolute vq). In this regard, the following equations apply (in connection with Equations 14 and 15, it is noted that in both regeneration quadrants vq must increase in order to reduce absolute iq; in connection with Equations 16 and 17, the relationship holds in dynamic terminal voltages):

Equation 13 [Q Axis Current Regulation]:

$$v_{qs}^e = (i_{qs}^{e*} - i_{qs}^e)\frac{sk_p + k_i}{s} \quad \text{Equation 13}$$

Equation 14 [Regeneration with Positive Speed]:

$\omega_e > 0 \rightarrow v_{qs}^e > 0$ $|i_{qs}^{e*}| < |i_{qs}^e|$ $i_{qs}^e < 0$ $\therefore i_{qs}^{e*} - i_{qs}^e > 0$ $i_{qs}^{e*} - i_{qs}^e > 0 \rightarrow \Delta v_{qs}^e > 0$ \quad Equation 14

Equation 15 [Regeneration with Negative Speed]:

$\omega_e < 0 \rightarrow v_{qs}^e < 0$ $|i_{qs}^{e*}| < |i_{qs}^e|$ $i_{qs}^e > 0$ $\therefore i_{qs}^{e*} - i_{qs}^e < 0$ $i_{qs}^{e*} - i_{qs}^e < 0 \rightarrow \Delta v_{qs}^e < 0$ \quad Equation 15

Equations 16 and 17 [Dynamic Terminal Voltage]:

$$v_{qs}^e = i_{qs}^e r_s + \frac{d}{dt}i_{qs}^e L_s \sigma + i_{ds}^e L_s \omega_e \quad \text{Equation 16}$$

$$v_{ds}^e = i_{ds}^e r_s + \frac{d}{dt}i_{ds}^e L_s - i_{qs}^e L_s \sigma \omega_e \quad \text{Equation 17}$$

Reference will now be made to an aspect of the present disclosure in which the limiter in motoring operates as in a convention mechanism but in which the limiter in generate (regeneration) operates to limit vq from below (Vq is always allowed to increase, reducing Iq and lowering terminal voltage).

Figure 3:
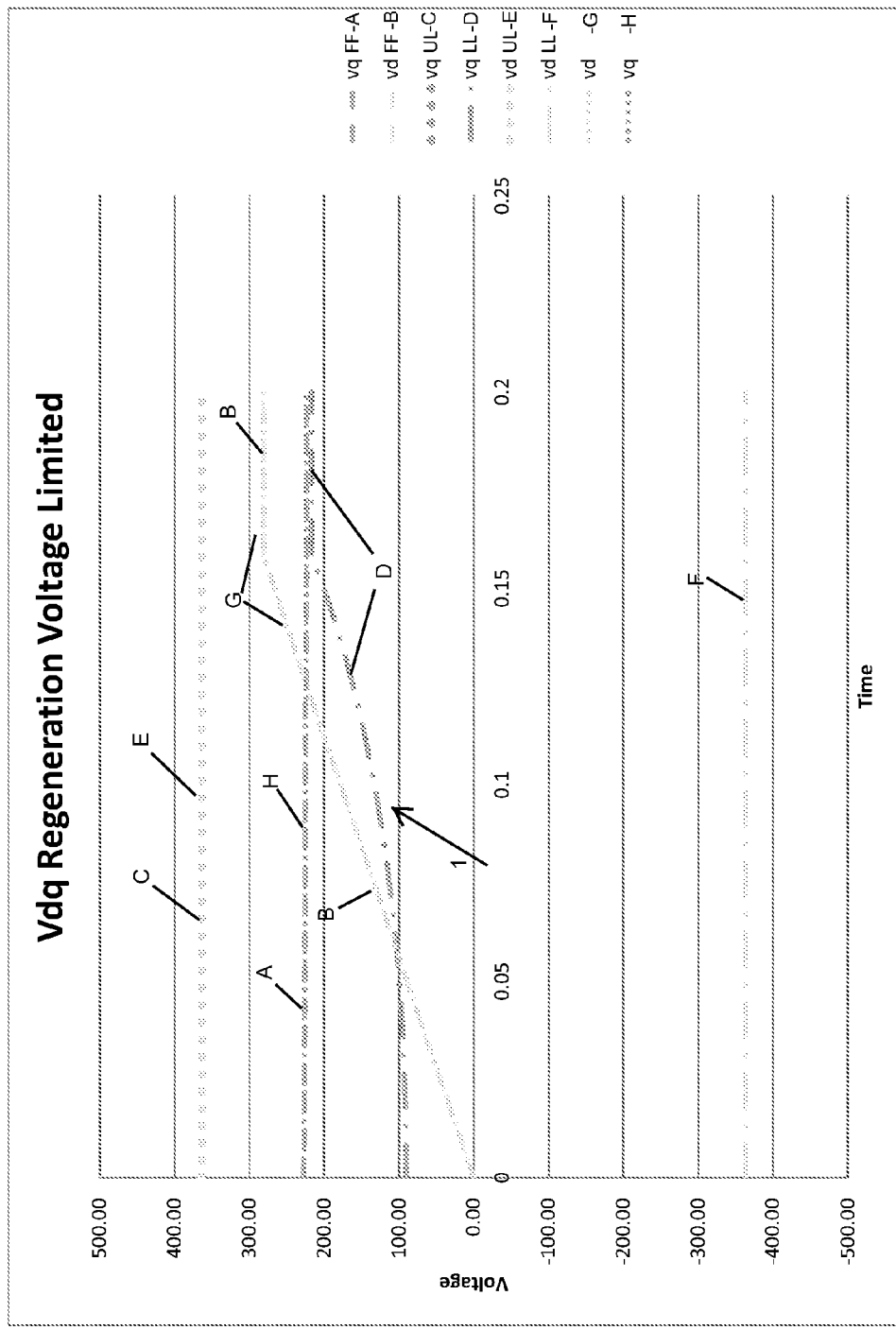
FIG. 3 illustrates a graph associated with a voltage limiting mechanism according to an aspect of the present disclosure (in particular, a graph related to Vdq in regeneration when voltage is limited)

Referring now to FIG. 3, illustrated is a graph associated with a voltage limiting mechanism according to an aspect of the present disclosure (in particular, a graph related to Vdq in regeneration when voltage is limited).

In connection with this FIG. 3, vq FF (Feed forward) shown as trace "A", vd FF (Feed forward) is shown as trace "B", vq UL (Upper Limit) is shown as trace "C", vq LL (Lower Limit) is shown as trace "D", vd UL (Upper Limit) is shown as trace "E", vd LL (Lower Limit) is shown as trace "F", vd is shown as trace "G" and vq is shown as trace "F" (Feed Forward are the predicted d/q voltages that are used as a "feed forward" for the current regulators). As shown by arrow 1, Vq limit fades in from below in order to maintain current regulation as long as possible.

Still referring to FIG. 3, the following equations apply:
Equations 18 and 19 [Q Axis Limits Positive VqFF]:

$$v_{qs\_UL}^e = \frac{v_{dc}}{\sqrt{3}} \quad \text{Equation 18}$$

$$v_{qs\_LL}^e = 2|v_{qsFF}^e| - \sqrt{\frac{v_{dc}^2}{\sqrt{3}} - v_{ds}^{e*2}} \quad \text{Equation 19}$$

Equations 20 and 21 [D axis maintains full priority]:

$$v_{ds\_UL}^e = \frac{v_{dc}}{\sqrt{3}} \quad \text{Equation 20}$$

$$v_{ds\_LL}^e = -\frac{v_{dc}}{\sqrt{3}} \quad \text{Equation 21}$$

Equations 23 and 23 [Q Axis Limits Negative VqFF]:

$$v_{qs\_UL}^e = -2|v_{qsFF}^e| + \sqrt{\frac{v_{dc}^2}{\sqrt{3}} - v_{ds}^{e*2}} \quad \text{Equation 22}$$

$$v_{qs\_LL}^e = -\frac{v_{dc}}{\sqrt{3}} \quad \text{Equation 23}$$

Figure 4A:
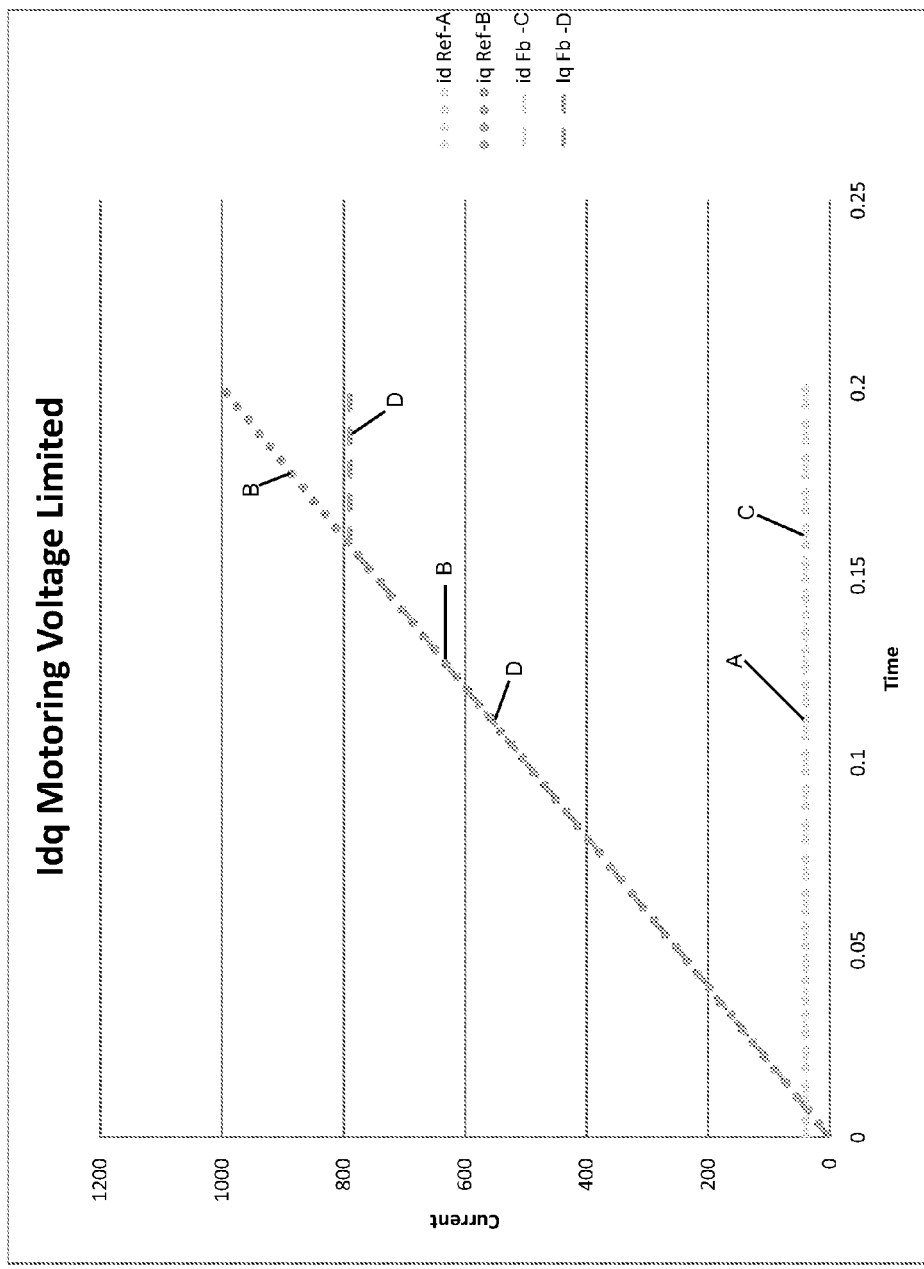
FIG. 4A illustrates a graph associated with a voltage limiting mechanism according to an aspect of the present disclosure (in particular, a graph related to Idq in motoring when voltage is limited)

Referring now to FIG. 4A, illustrated is a graph associated with a voltage limiting mechanism according to an aspect of the present disclosure (in particular, a graph related to Idq in motoring when voltage is limited). In connection with this FIG. 4A, id Ref (Reference) is shown as trace "A", iq Ref (Reference) is shown as trace "B", id Fb (Feedback) is shown as trace "C" and iq Fb (feedback) is shown as trace "D". In this FIG. 4A, id Ref and iq Ref refer to amounts you want and id Fb and iq Fb refer to amounts that you are getting.

Figure 4B:
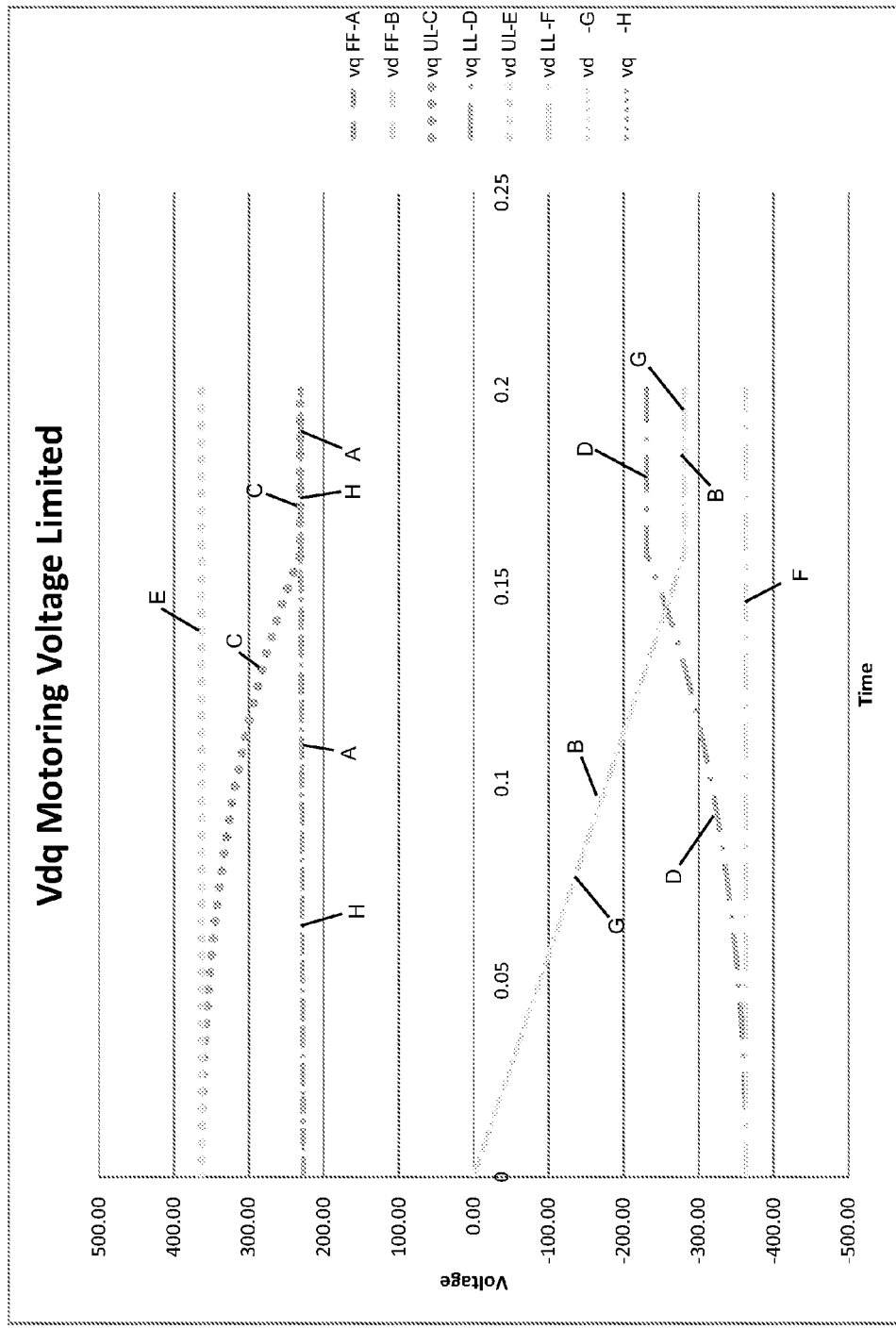
FIG. 4B illustrates a graph associated with a voltage limiting mechanism according to an aspect of the present disclosure (in particular, a graph related to Vdq in motoring when voltage is limited)

Referring now to FIG. 4B, illustrated is a graph associated with a voltage limiting mechanism according to an aspect of the present disclosure (in particular, a graph related to Vdq in motoring when voltage limited). In connection with this FIG. 4B, vq FF (Feed forward) is shown as trace "A", vd FF (Feed forward) is shown as trace "B", vq UL (Upper Limit) is shown as trace "C", vq LL (Lower Limit) is shown as trace "D", vd UL (Upper Limit) is shown as trace "E", vd LL (Lower Limit) is shown as trace "F", vd is shown as trace "G" and vq is shown as trace "F" (Feed Forward are the predicted d/q voltages that are used as a "feed forward" for the current regulators).

Figure 4C:
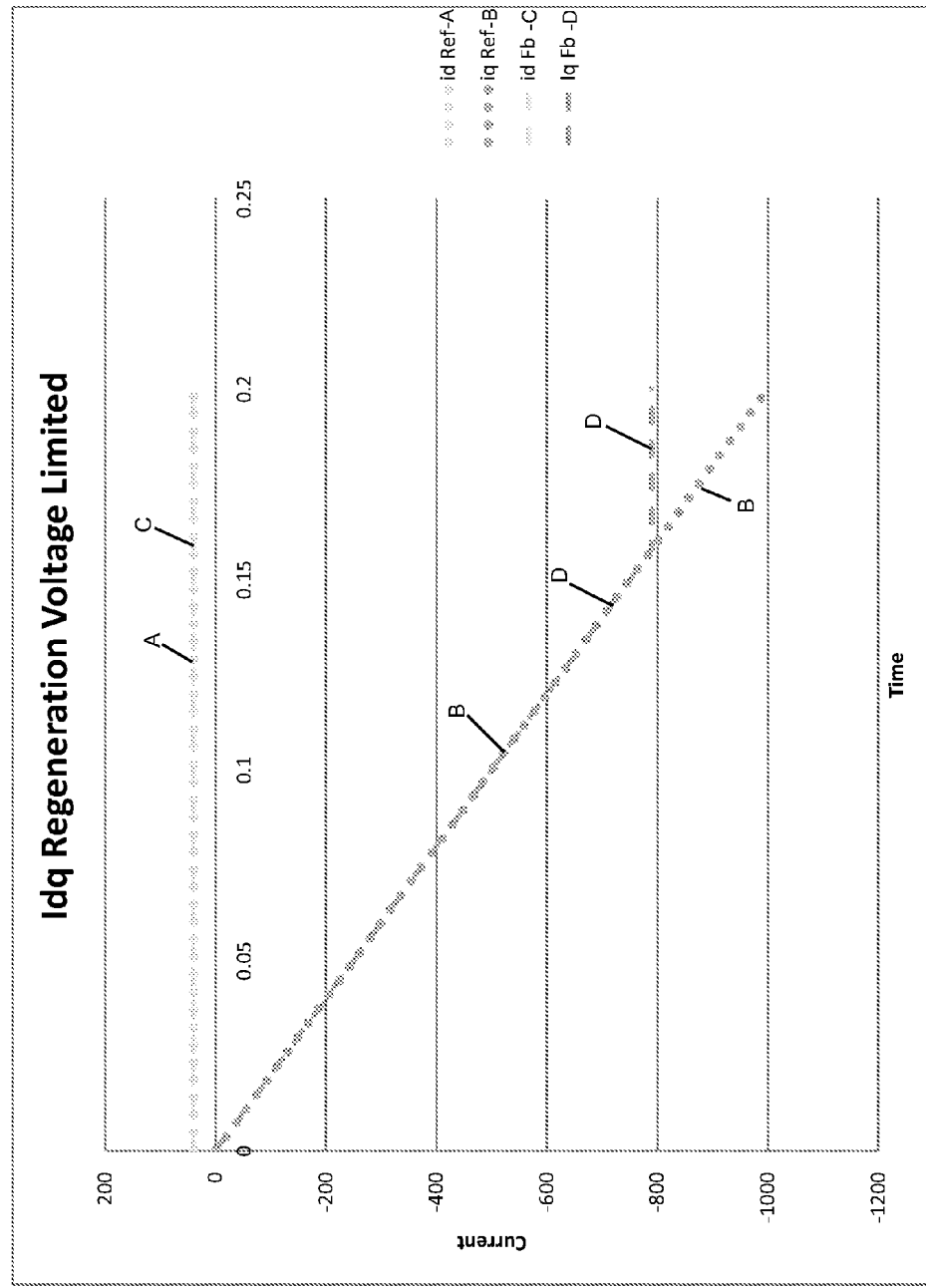
FIG. 4C illustrates a graph associated with a voltage limiting mechanism according to an aspect of the present disclosure (in particular, a graph related to Idq in regeneration when voltage is limited).

Referring now to FIG. 4C, illustrated is a graph associated with a voltage limiting mechanism according to an aspect of the present disclosure (in particular, a graph related to Idq in regeneration when voltage limited). In connection with this FIG. 4C, id Ref (Reference) is shown as trace "A", iq Ref (Reference) is shown as trace "B", id Fb (Feedback) is shown as trace "C" and iq Fb (feedback) is shown as trace "D". In this FIG. 4C, id Ref and iq Ref refer to amounts you want and id Fb and iq Fb refer to amounts that you are getting.

Figure 5:
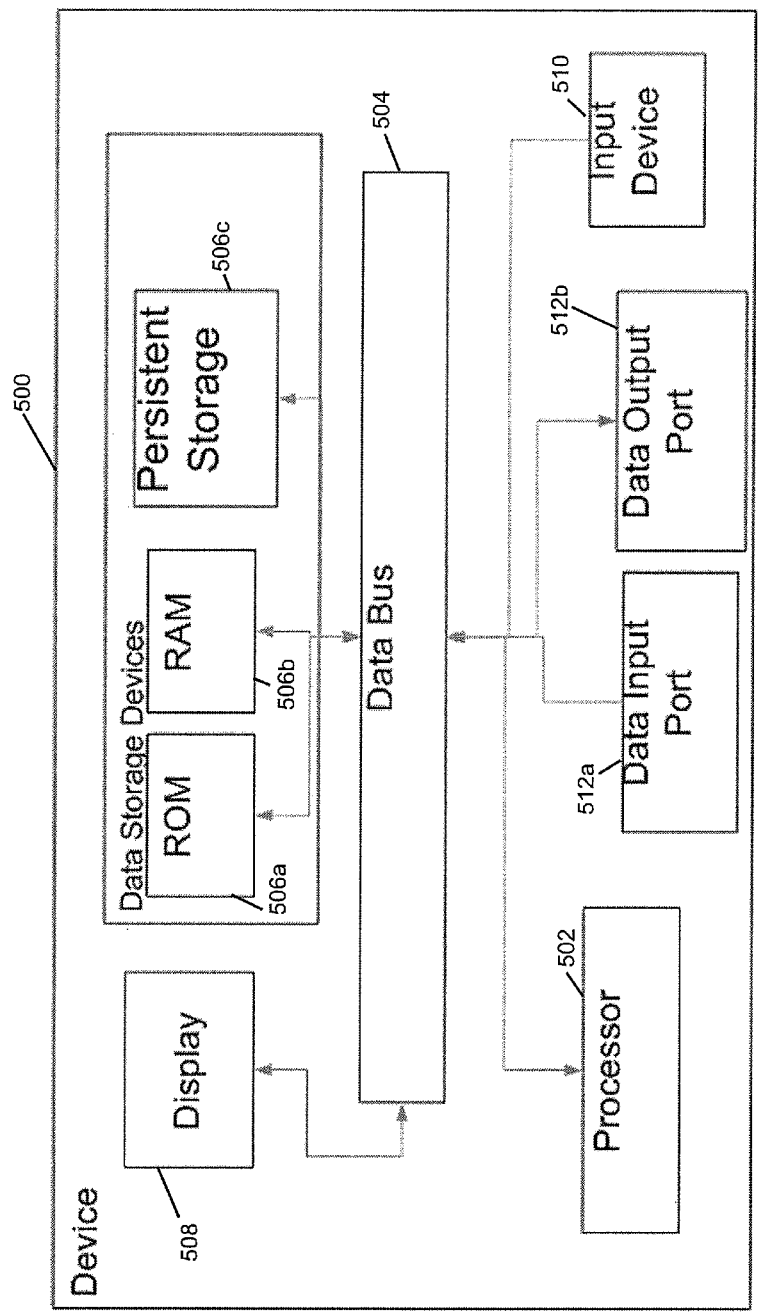
FIG. 5 illustrates a block diagram of a device according to an aspect of the present disclosure.

Referring now to FIG. 5, illustrated is block diagram of a device according to an aspect of the present disclosure. As seen in this FIG. 5, device 500 includes processor 502, data bus 504, ROM 506a, RAM 506b, persistent storage 506c, display 508, input device 510, data input port 512a and data output port 512b.

Figure 6:
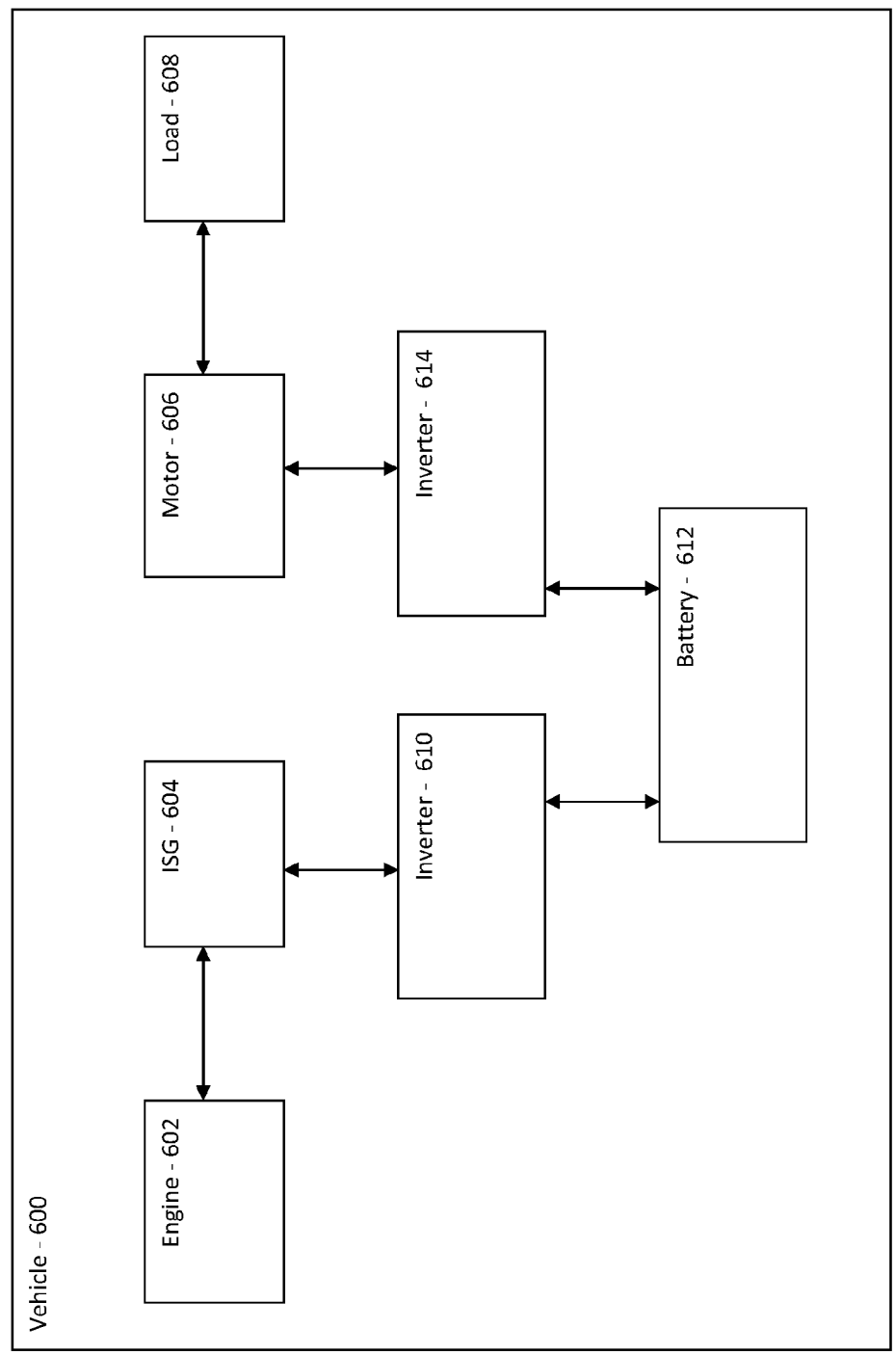
FIG. 6 illustrates a block diagram of a system according to an aspect of the present disclosure.

Referring now to FIG. 6, illustrated is a block diagram of a system according to an aspect of the present disclosure. As seen in this FIG. 6, in one example, implementation may be in a vehicle. The vehicle 600 may include engine 602 (connected to integrated starter generator (ISG) 604). In one example, the integrated starter generator may be of a surface permanent magnet type. The vehicle 600 may also include motor 606 (connected to load 606). Load 608 may comprise, for example, the remainder of a driveline (excluding motor 606). In one example, the motor may be of an induction type. Further, inverter 610 may be disposed between integrated starter generator 604 and battery 612 (which may comprise one or more batteries). Further still, inverter 614 may be disposed between motor 606 and battery 612. Further still, in one example inverter 614 may include therein device 500 of the type shown in FIG. 5 (the device 500 may communicate (such as bi-directionally with inverter 614) via data input port 512a and data output port 512b. Further still, in one example inverter 610 may include therein device 500 of the type shown in FIG. 5 (the device 500 may communicate (such as bi-directionally with inverter 610) via data input port 512a and data output port 512b.

Figure 7:
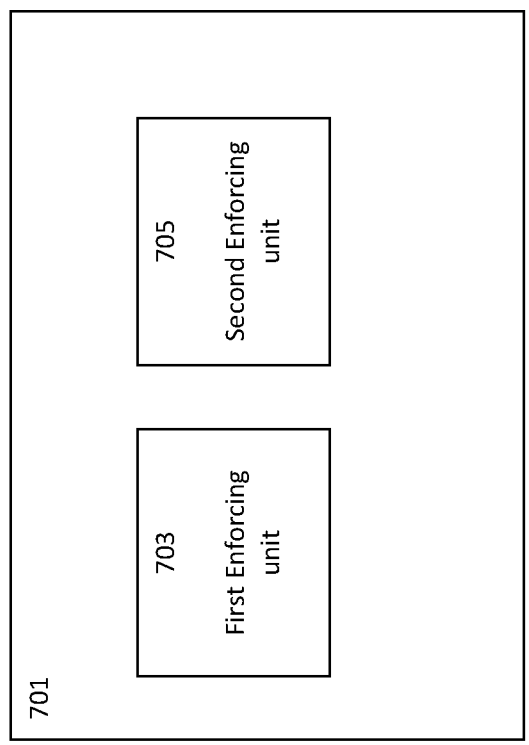
FIG. 7 illustrates a block diagram of a system component according to an aspect of the present disclosure.

Referring now to FIG. 7, illustrated is a block diagram of a system component 701 according to an aspect of the present disclosure. This system component 701 is a memory (such as, for example, a type shown in FIG. 5) and includes therein computer readable instructions that, when executed by a processor (such as, for example, a type shown in FIG. 5), implement first enforcing unit 703 (for enforcing, in a motoring operation, an upper limit for q-axis voltage) and second enforcing unit 705 (for enforcing, in a regeneration operation, a lower limit for q-axis voltage).

Figure 8:
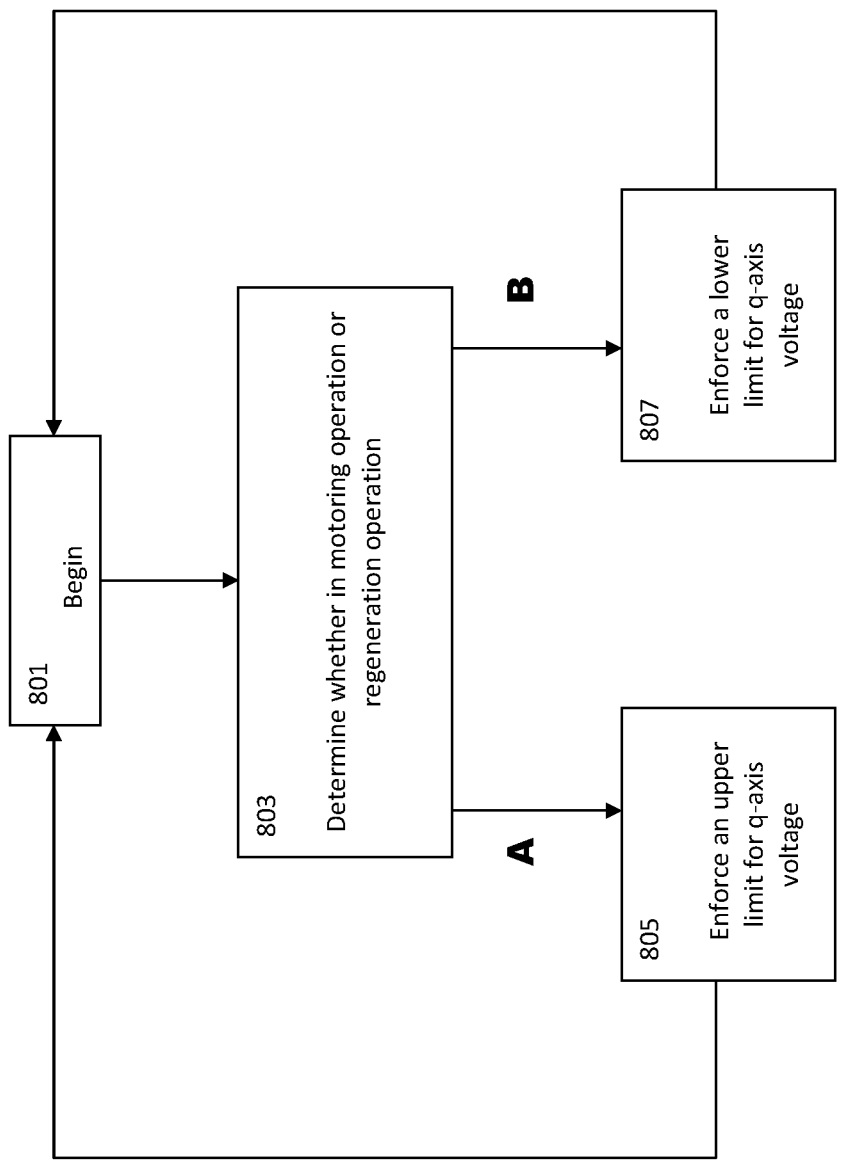
FIG. 8 illustrates a block diagram of a method according to an aspect of the present disclosure.

Referring now to FIG. 8, illustrated is a block diagram of a method according to an aspect of the present disclosure. As seen in this FIG. 8, the process begins at step 801. At step 803 it is determined whether the system is in a motoring operation or a regeneration operation. If the system is in a motoring operation (arrow "A") an upper limit for q-axis voltage is enforced at step 805 (after step 805, the method may iteratively repeat at step 801). If, on the other hand, it is determined at step 803 that the system is in a regeneration operation (arrow "B") a lower limit for q-axis voltage is enforced at step 807 (after step 807, the method may iteratively repeat at step 801).

As described herein, in one aspect of the disclosure, in order to provide a robust drive, machine control must be maintained when commanding both motoring and regeneration torque under all operating conditions.

As described herein, in one aspect of the disclosure, a four quadrant voltage limiter is provided that properly limits the phase voltage commanded to within the capability of the inverter by maintaining rotor flux and folding back torque under both motoring and regeneration torque commands. Under rotor flux orientation it can be shown that as the absolute value of q axis current is reduced both the necessary volt seconds and generated torque will be reduced. It is desirable to maintain flux in order to keep low phase currents, as such, d axis current must have priority and, as such, d axis voltage must be allowed to take on any value the inverter can produce. In motoring operation the q axis voltage limit is then limited (have a ceiling) to be the remaining inverter capability in quadrature to the required d axis voltage (used to regulate flux). When regeneration torque is commanded (more voltage is less current), d axis voltage (and/or current) maintains priority, but q axis voltage is limited (have a floor) from below the nominal value necessary to maintain flux (as a reduction in q axis voltage causes additional q axis current to flow—increasing the needed volt seconds). In this aspect of the disclosure, the voltage limiter only changes modes (motoring or regeneration) when q axis current and/or the rotational speed of the machine cross zero. In both situations the phase voltage vector will be low in amplitude, eliminating mode change transients from occurring near the inverter's voltage limit.

In one example, a motoring mode may have positive or negative speed. In another example, a regeneration mode may have positive or negative speed.

In one example, q axis current may be folded back (that is, the absolute value is reduced) as the inverter runs out of voltage (e.g., d axis gets all it wants).

Aspects of this disclosure are applicable to any machine and inverter operating under rotor flux oriented control, including internal permanent magnet, surface permanent magnet and induction machines.

As described herein, in various aspects of the disclosure, are techniques to maintain control and provide as much torque as possible.

In one embodiment, a processor-implemented four quadrant voltage limiter method that limits a commanded phase voltage to within a volt second capability of an inverter is provided, the four quadrant voltage limiter method comprising: in a motoring operation, enforcing by the processor an upper limit for a q-axis voltage; and in a regeneration operation, enforcing by the processor a lower limit for the q-axis voltage.

In one example, the commanded phase voltage is limited to within the volt second capability of the inverter by maintaining a rotor flux and folding back a torque under both motoring and regeneration torque commands.

In another example, in the motoring operation, the upper limit is a remaining inverter capability when a d-axis voltage is allowed to take on any value that the inverter can produce.

In another example, in the regeneration operation, a d-axis voltage is allowed to take on any value that the inverter can produce.

In another example, in the regeneration operation, the lower limit is below a nominal value necessary to maintain flux.

In another example, the motoring operation has a speed selected from the group of: (a) positive speed; and (b) negative speed; and the regeneration operation has a speed selected from the group of: (a) positive speed; and (b) negative speed.

In another example, the motoring operation and the regeneration operation are used in a vehicle.

In another embodiment, a four quadrant voltage limiter system that limits a commanded phase voltage to within a volt second capability of an inverter is provided, the four quadrant voltage limiter system comprising a processor; a memory storing computer readable instructions that, when executed by the processor, implement: a first enforcing unit for enforcing, in a motoring operation, an upper limit for a q-axis voltage; and a second enforcing unit for enforcing, in a regeneration operation, a lower limit for the q-axis voltage.

In one example, the commanded phase voltage is limited to within the volt second capability of the inverter by maintaining a rotor flux and folding back a torque under both motoring and regeneration torque commands.

In another example, in the motoring operation, the upper limit is a remaining inverter capability when a d-axis voltage is allowed to take on any value that the inverter can produce.

In another example, in the regeneration operation, a d-axis voltage is allowed to take on any value that the inverter can produce.

In another example, in the regeneration operation, the lower limit is below a nominal value necessary to maintain flux.

In another example, the motoring operation has a speed selected from the group of: (a) positive speed; and (b) negative speed; and the regeneration operation has a speed selected from the group of: (a) positive speed; and (b) negative speed.

In another example, the motoring operation and the regeneration operation are used in a vehicle.

In another embodiment a computer readable storage device including a computer program for four quadrant voltage limiting that limits a commanded phase voltage to within a volt second capability of an inverter is provided, the computer program including instructions for: in a motoring operation, enforcing an upper limit for a q-axis voltage; and in a regeneration operation, enforcing a lower limit for the q-axis voltage.

In one example, the commanded phase voltage is limited to within the volt second capability of the inverter by maintaining a rotor flux and folding back a torque under both motoring and regeneration torque commands.

In another example, in the motoring operation, the upper limit is a remaining inverter capability when a d-axis voltage is allowed to take on any value that the inverter can produce.

In another example, in the regeneration operation, a d-axis voltage is allowed to take on any value that the inverter can produce.

In another example, in the regeneration operation, the lower limit is below a nominal value necessary to maintain flux.

In another example, the motoring operation has a speed selected from the group of: (a) positive speed; and (b) negative speed; and the regeneration operation has a speed selected from the group of: (a) positive speed; and (b) negative speed.

In other examples, any steps described herein may be carried out in any appropriate desired order.

Aspects of this disclosure relate to a device, a method and a program (computer program).

Aspects of this disclosure may be utilized in connection with a vehicle (e.g., a bus, a truck, an automobile). In one specific example, aspects of this disclosure may be applied to a hybrid vehicle.

In one aspect of the disclosure, a controller (such as a system controller) which receives commanded values (and which provides one or more of the techniques disclosed herein) may be included in an inverter. In another aspect of the disclosure, a controller (such as a system controller) which receives commanded values (and which provides one or more of the techniques disclosed herein) may be distinct from an inverter (e.g., may be part of a vehicle-level controller).

In an aspect of the disclosure, various techniques disclosed herein may be implemented in an FPGA, a microcontroller, and/or in software (e.g., fixed-clock software with a real-time processor).

In an aspect of the disclosure, a control system includes a processor, at least one data storage device, such as, but not limited to, RAM, ROM and persistent storage, and an external interface.

The processor is configured to execute one or more programs stored in a computer readable storage device. The computer readable storage device can be RAM, persistent storage or removable storage. For example, the processor can execute instructions in a program that may be loaded into RAM. The processor may include one or more processing units. The processor can be, but is not limited to, a CPU or a GPU.

A storage device is any piece of hardware that is capable of storing information, such as, for example without limitation, data, programs, instructions, program code, and/or other suitable information, either on a temporary basis and/or a permanent basis.

In another aspect of the disclosure, an ASIC, FPGA, a PAL and PLA can be used as the processor.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terms "a control system" and "controller" as may be used in the present disclosure may include a variety of combinations of fixed and/or portable computer hardware, software, peripherals, and storage devices. The controller and/or control system may include a plurality of individual components that are networked or otherwise linked to perform collaboratively, or may include one or more stand-alone components. The hardware and software components of the control system and/or controller of the present disclosure may include and may be included within fixed and portable devices such as desktop, laptop, and/or server, and network of servers (cloud).

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A computer processor-implemented four quadrant voltage limiter method that limits a commanded phase voltage to within a volt second capability of an inverter, the four quadrant voltage limiter computer processor-implemented method comprising:
   enforcing by a computer processor an upper limit for a q-axis voltage in a motoring operation, under a condition where the inverter is unable to generate a requested torque;
   enforcing by the computer processor a lower limit for the q-axis voltage in a regeneration operation, the lower limit being below a nominal value necessary to maintain flux; and
   outputting a command by the computer processor to the inverter to enforce the upper limit and the lower limit for the q-axis voltage to limit the commanded phase voltage to within a volt second capability of the inverter.

2. The method of claim 1, wherein the commanded phase voltage is limited to within the volt second capability of the inverter by maintaining a rotor flux and folding back a torque under both motoring and regeneration torque commands.

3. The method of claim 1, wherein, in the motoring operation, the upper limit is a remaining inverter capability when a d-axis voltage is allowed to take on any value that the inverter can produce.

4. The method of claim 1, wherein, in the regeneration operation, a d-axis voltage is allowed to take on any value that the inverter can produce.

5. The method of claim 1, wherein: the motoring operation has a speed selected from the group of: (a) positive speed; and (b) negative speed; and the regeneration operation has a speed selected from the group of: (a) positive speed; and (b) negative speed.

6. The method of claim 1, wherein the motoring operation and the regeneration operation are used in a vehicle.

7. A four quadrant voltage limiter system that limits a commanded phase voltage to within a volt second capability of an inverter, the four quadrant voltage limiter system comprising:
   a processor; and
   a memory storing computer readable instructions that, when executed by the processor, implement:
   a first enforcing unit for enforcing, in a motoring operation, an upper limit for a q-axis voltage under a condition where the inverter is unable to generate a requested torque; and
   a second enforcing unit for enforcing, in a regeneration operation, a lower limit for the q-axis voltage, the lower limit being below a nominal value necessary to maintain flux,
   wherein enforcing the upper limit and the lower limit for the q-axis voltage limits the commanded phase voltage to within a volt second capability of the inverter.

8. The system of claim 7, wherein the commanded phase voltage is limited to within the volt second capability of the inverter by maintaining a rotor flux and folding back a torque under both motoring and regeneration torque commands.

9. The system of claim 7, wherein, in the motoring operation, the upper limit is a remaining inverter capability when a d-axis voltage is allowed to take on any value that the inverter can produce.

10. The system of claim 7, wherein, in the regeneration operation, a d-axis voltage is allowed to take on any value that the inverter can produce.

11. The system of claim 7, wherein:
    the motoring operation has a speed selected from the group of: (a) positive speed; and
    (b) negative speed; and
    the regeneration operation has a speed selected from the group of: (a) positive speed;
    and (b) negative speed.

12. The system of claim 7, wherein the motoring operation and the regeneration operation are used in a vehicle.

13. A computer readable storage device including a computer program for four quadrant voltage limiting that limits a commanded phase voltage to within a volt second capability of an inverter, the computer program including instructions for:
    in a motoring operation, enforcing an upper limit for a q-axis voltage under a condition where the inverter is unable to generate a requested torque; and
    in a regeneration operation, enforcing a lower limit for the q-axis voltage, the lower limit being below a nominal value necessary to maintain flux,
    wherein enforcing the upper limit and the lower limit for the q-axis voltage limits the commanded phase voltage to within a volt second capability of the inverter.

14. The computer readable storage device of claim 13, wherein the commanded phase voltage is limited to within the volt second capability of the inverter by maintaining a rotor flux and folding back a torque under both motoring and regeneration torque commands.

15. The computer readable storage device of claim 13, wherein, in the motoring operation, the upper limit is a remaining inverter capability when a d-axis voltage is allowed to take on any value that the inverter can produce.

16. The computer readable storage device of claim 13, wherein, in the regeneration operation, a d-axis voltage is allowed to take on any value that the inverter can produce.

17. The computer readable storage device of claim 13, wherein:
    the motoring operation has a speed selected from the group of: (a) positive speed; and
    (b) negative speed; and
    the regeneration operation has a speed selected from the group of: (a) positive speed;
    and (b) negative speed.

* * * * *